United States Patent
Kapil (12)

(10) Patent No.: US 6,735,707 B1
(45) Date of Patent: *May 11, 2004

(54) HARDWARE ARCHITECTURE FOR A MULTI-MODE POWER MANAGEMENT SYSTEM USING A CONSTANT TIME REFERENCE FOR OPERATING SYSTEM SUPPORT

(75) Inventor: Sanjiv Kapil, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 604 days.

This patent is subject to a terminal disclaimer.

(21) Appl. No.: 09/698,427

(22) Filed: Oct. 27, 2000

(51) Int. Cl.⁷ .................................................. G06F 1/32
(52) U.S. Cl. ........................ 713/322; 713/400; 713/502
(58) Field of Search ................................ 713/322, 400, 713/502

(56) References Cited

U.S. PATENT DOCUMENTS

| 5,319,772 A | 6/1994 | Hwang ........................ 395/550 |
| 5,428,790 A | 6/1995 | Harper et al. ............... 395/750 |
| 5,987,614 A | * 11/1999 | Mitchell et al. ............. 713/300 |
| 6,118,306 A | 9/2000 | Orton et al. ................... 327/44 |
| 6,397,340 B2 | * 5/2002 | Watts et al. .................. 713/322 |
| 6,668,330 B1 | * 12/2003 | Kapil .......................... 713/322 |

FOREIGN PATENT DOCUMENTS

EP    0 487 049 A1   5/1992   ............. G06F/1/32

OTHER PUBLICATIONS

International Search Report, dated Nov. 25, 2002, 7 pages.

* cited by examiner

*Primary Examiner*—Thomas Lee
*Assistant Examiner*—Albert Wang
(74) *Attorney, Agent, or Firm*—Osha Novak & May L.L.P.

(57) ABSTRACT

A system for implementing a power management system in a computer system using a constant time reference to support an operating system. The system uses a PCI clock signal and a CPU clock signal to generate the constant time reference such that the operating system uses the constant time reference when the power management system causes the computer system's CPU frequency to change or when the CPU frequency has changed. The power management system comprises of circuitry to interface between normal power management system operations with that of the operations used to support the operating system.

20 Claims, 8 Drawing Sheets

HARDWARE ARCHITECTURE FOR A MULTI-MODE POWER MANAGEMENT SYSTEM USING A CONSTANT TIME REFERENCE FOR OPERATING SYSTEM SUPPORT

BACKGROUND OF THE INVENTION

With reference to FIG. 1, a modern computer system may be divided roughly into four conceptual elements: the hardware (10), the operating system (12), the application programs (14), and the users (16, 18, 20, 22). The hardware (10), i.e., the microprocessor, the memory, and the input/output devices, provides the basic computing resources. The application programs (14), such as compilers, database systems, software, and business programs, define the ways in which these resources are used to solve the computing problems of the users. The users (16, 18, 20, 22), people, machines, and other computers, use the application programs, which in turn employ the hardware, to solve numerous types of problems.

An operating system ("OS") (12) is a program that acts as an intermediary between a user of a computer system and the computer hardware. The purpose of an operating system is to provide an environment in which a user can execute programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary for tasks. Because there may be many, possibly conflicting, requests for resources, the operating system must decide which requests are allocated resources to operate the computer system efficiently and fairly.

Moreover, an operating system can be characterized as a control program. A control program controls the execution of user programs to prevent errors and improper use of the computer. It is especially concerned with the operation of I/O devices. In general, operating systems exist because they are a reasonable way to solve the problem of creating a usable computing system. The fundamental goal of a computer system is to execute user programs and make solving user problems easier. Toward this goal, computer hardware (10) is constructed. Because bare hardware alone is not particularly easy to use, application programs are developed. These various programs require certain common operations, such as those controlling the I/O operations. The common functions of controlling and allocating resources are then brought together into one piece of software: the operating system. The operating system, in turn, needs a constant time reference to support the aforementioned tasks and administrative tasks such as thread scheduling, process scheduling, event scheduling, and other system related activities.

A typical operating system uses the CPU clock for its constant time reference. Modern CPUs have frequencies between 166 MHz to over 600 MHz. For example, an UltraSparc-IIe microprocessor developed by Sun Microsystems in Palo Alto, Calif., runs at speeds greater than 500 MHz, meaning that the processor goes through more than $500 \times 10^6$ CPU clock cycles per second.

In order to conserve energy, some computer systems incorporate power control mechanisms. For example, Energy Star ("E*") power requirements require system power consumption to be lowered to 15% of the normal operating power consumption level when the system is idle. In order to meet this goal, the system must turn off (or lower the operating frequencies of) inactive devices (disk drives, network cards, etc.). In addition, the CPU itself should enter into power saving mode, because it is likely to be the most power-consuming device in the system.

To save power, the CPU must lower its operating frequency. The CPU cannot be turned off entirely because this, in effect, would shut down the entire system. When the CPU lowers its operating frequency, the time reference for the operating system changes, and it consequently performs its duties depending upon a varying time reference. During the change over to different frequency modes, the operating system loses its absolute reference of time, which it had before the frequency change, and counters using the CPU core clock increment at different rates as the frequency changes.

Because the operating system designates and allocates system resources to different tasks, it must have a constant time reference in order to perform those tasks effectively and efficiently. If there is not a constant time reference, the operating system is forced to attempt to schedule tasks using a fluctuating time reference. This results in the loss of many clock cycles while the operating system waits for a constant time reference to be established, and eventually this effect inhibits system performance.

The prior art allows an operating system to delay its requests and interrupts to system hardware when the CPU core frequency of the system is being changed. Hardware embodying such a system includes registers which base their clock cycles on a CPU clock to generate periodic interrupts to the operating system. However, when the CPU clock frequency changes as the system enters or exits a power save mode, the interrupt periods vary and therefore the operating system schedules events indeterministically. The prior art also embodies systems in which the operating system simply and waits for the system to complete its frequency change transition and accepts the loss of many clock cycles. All requests and interrupts are stalled until the system frequency has been changed to a desired frequency.

SUMMARY OF THE INVENTION

In one aspect, the invention relates to a system for implementing a power management scheme to conserve computer system power when computer resources are idle. The system further provides a plurality of power saving modes that can be entered into when designated by system software. The system further includes implementation of the power management scheme with minimal changes to pre-existing system conditions.

In another aspect, the invention relates to a method for providing a constant time reference for operating system support for event scheduling, process scheduling, and other administrative purposes. The method further includes providing a constant time reference when the system is changing to a power save mode and also when the system is in a power save mode.

In another aspect, the invention relates to a method for software to implement the power management scheme. The method includes software controlling the power management scheme by monitoring and determining when computer resources are idle and how the hardware should react to a designated power save mode request.

Other aspects and advantages of the invention will be apparent from the following description and the appended claims.

DETAILED DESCRIPTION OF THE INVENTION

The present invention relates to a system for implementing a power management scheme that conserves computer system power when computer resources are idle. The system also relates to a system for providing a constant time reference for operating system ("OS") support using a peripheral component interconnect ("PCI") interface when the computer system is changing between different CPU frequencies. In order to provide a constant absolute reference of time to the operating system, embodiments of the present invention implement a scheme that uses the PCI frequency along with a CPU frequency to generate a constant time reference frequency.

The PCI is a local bus standard that most modern computer systems incorporate within their respective systems to connect different system components. The PCI is a 64-bit bus, though it is usually implemented as a 32-bit bus. It usually operates at clock speeds of 33 or 66 MHz.

In order to meet the Estar ("E*") requirements mentioned above, a system must implement a method by which it can conserve power by lowering its CPU frequency. Table 1 provides the estimated power consumption levels in different frequency modes of the UltraSparc-IIe microprocessor.

TABLE 1

Power Consumption Levels in
Different Frequency Modes of UltraSparc-IIe

| E* Mode | $f_{CPU}$ (CPU frequency) | Power Consumption |
| --- | --- | --- |
| None | 1/1 = 500 MHz | 12 W |
| Power Save | 1/2 = 250 MHz | <6 W |
| Power Save | 1/6 = 83.3 MHz | <3 W |

To achieve the power consumption requirements, the UltraSparc-IIe implements a power management scheme by changing the CPU clock to one-half (½) and one-sixth (⅙) of the normal operating frequency. Typically, the scheme specifications are programmable by system software. Table 2 provides the sequences the system software must go through to power down and power up the system (discussed further below with reference to FIG. 3).

TABLE 2

Power Down/Up Sequence

| Current Mode | Desired Mode | Sequence |
| --- | --- | --- |
| 1/1 | 1/2 | 1/1 -> 1/2 |
| 1/2 | 1/6 | 1/2 -> 1/6 |
| 1/6 | 1/2 | 1/6 -> 1/2 |
| 1/2 | 1/1 | 1/2 -> 1/1 |

The limitation of the ⅙ ratio is due to the internal PCI synchronizer's requirement of $f_{CPU} >= 2 f_{EXTERNAL\_PCI}$. One difference between a system operating at normal frequency and a system operating in power save mode is that all requests and interrupts are serviced at a lower clock rate when the system is in the power save mode. System software monitors the system traffic and can decide to switch the internal CPU clock back to any mode the software deems appropriate.

Figure 1:
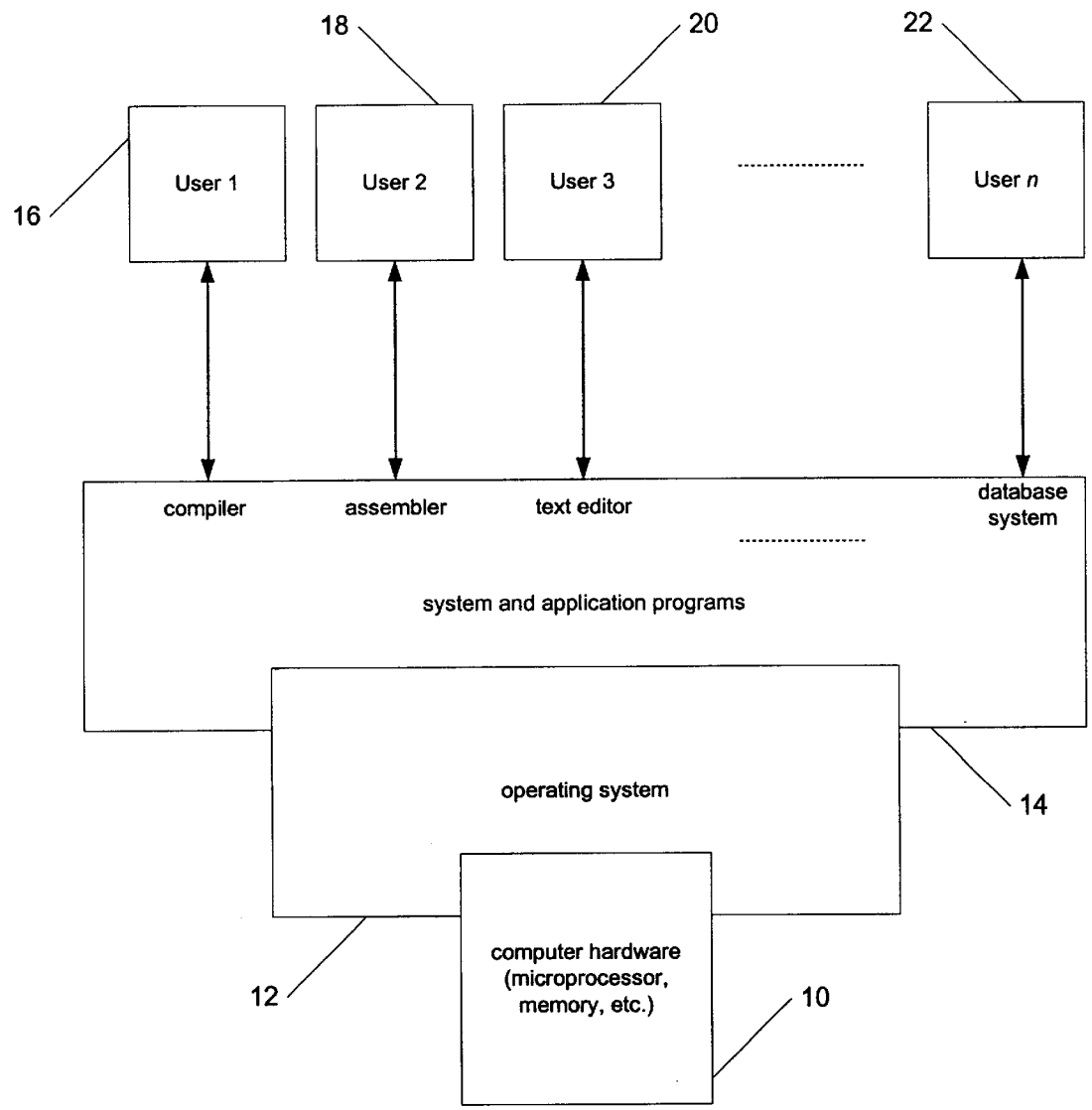
FIG. 1 shows a typical prior art computer system.
Figure 2:
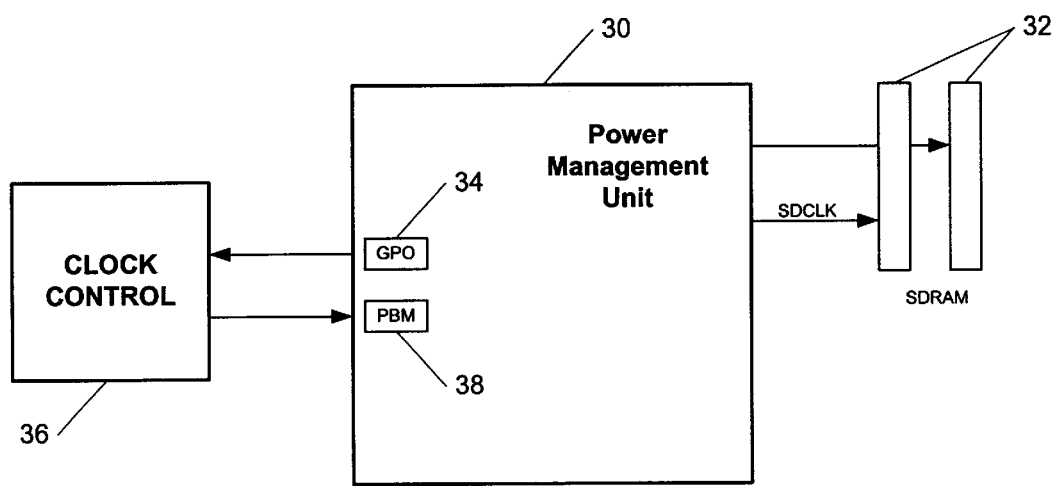
FIG. 2 is a block diagram of a power management scheme in accordance with an embodiment of the present invention.

FIG. 2 is a block diagram of an exemplary embodiment of the present invention. The figure shows a top-level hardware layout of a power management scheme which includes a power management unit (30). The default operating mode of the power management unit (30) is to operate at full power. When system software detects that a computer system has been idle for a certain period f of time, the software, by writing into an Estar Mode register ("ESTAR_MODE") (not shown), commands system hardware to power down. Upon this command, the power management unit (30) sequences through a series of steps in order to power down to a designated power save mode. The power management unit (30) first programs synchronous dynamic random access memory ("SDRAM") (32) to operate in self-refresh mode. The SDRAM (32) is a type of dynamic random access memory ("DRAM") that can operate at much higher clock speeds than conventional memory. Prior to entering into the power save mode, the SDRAM (32) synchronizes itself with the computer system's CPU bus and is refreshed continuously in order to function. However, when entering into the power save mode, the power management unit (30) programs the SDRAM (32) to operate in self-refresh mode so that the SDRAM (32) refreshes independent of the CPU clock. Further, the SDRAM (32) consumes less power when it is in self-refresh mode than when it is in a normal operation mode.

The SDRAM (32) can be configured to operate in self-refresh mode by writing into a memory control register ("MC0") (not shown). The memory control register is a register which software writes to in order to indicate the desired status for a particular memory unit. When system software instructs the hardware to power down, the system software enables a self-refresh enable bit (MC0[33]=1). Once this bit is enabled, the software generates a command to the hardware, which in turn, changes the operating mode of the SDRAM (32) to self-refresh mode, i.e., sleep mode. The hardware will automatically re-activate the SDRAM (32) on any incoming access to the SDRAM (32), i.e., when data needs to be retrieved from the SDRAM (32). Once the access is complete, the hardware puts the SDRAM (32) back into self-refresh mode. In order to return to normal SDRAM (32) operation, the system software must explicitly clear the self-refresh enable bit (MC0[33]=0).

Once the SDRAM (32) is programmed to operate in sleep mode, the power management unit (30) lowers the CPU operating clock frequency to ½ or ⅙ of the normal operating frequency by generating a signal to a clock control unit (36).

The clock control unit (36) usually manages all clock signals, including CPU clock signals and PCI clock signals.

The power management unit (30) then proceeds with generating clock control signals via a general purpose output ("GPO") unit (34) to the clock control unit (36) to lower or deactivate the operating frequency of certain external PCI devices. Two GPO pins (not shown) are provided to help instruct the clock control unit (36) to either slow down the clock from 33 MHz to 0 MHz or to increase the clock speed from 0 MHz to 33 MHz for external PCI devices.

In order to generate a constant time reference signal to the operating system, the power management unit (30) incorporates a PCI bus module ("PBM") (38). The PBM (38) is a main portion of a PCI interface between an external device and internal system hardware. The PBM (38) handles the timing of programmed input/output ("PIO") requests as well as direct memory access ("DMA") requests that are initiated by external PCI devices. PIO is a method of CPU initiated data transfer between two devices. In embodiments of the present invention, the power management unit (30) uses a portion of the PBM (38) to generate the constant time reference signal using a PCI clock and a CPU clock (discussed below).

Figure 3:
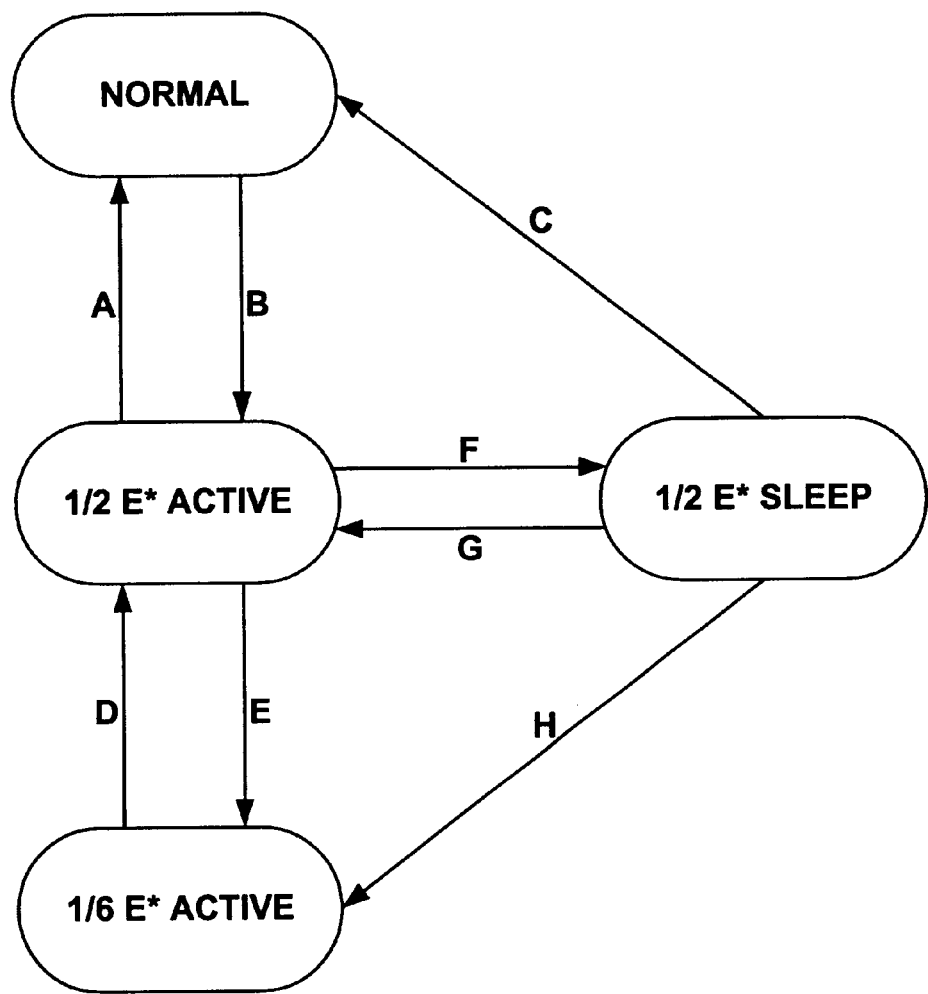
FIG. 3 shows a flow chart describing a process in accordance with an embodiment of the present invention.

System software implements the power management scheme as illustrated by the flow diagram in FIG. 3. Table 3 lists the necessary steps for each transition shown in FIG. 3.

TABLE 3

Steps for Individual Transitions Between Operating Modes

| Transition | Steps |
|---|---|
| A | Program new SDRAM Refresh Count for $f_{CPU/2}$<br>Program ½ E* mode in ESTAR_MODE<br>Wait for 16 clock cycles |
| B | Program SDRAM Refresh count for $f_{CPU}$<br>Program E* mode in ESTAR_MODE<br>Wait for 16 clock cycles |
| C | Program SDRAM Refresh count for $f_{CPU}$<br>Reset SDRAM Self Refresh Enable bit and activate devices<br>Program ½ E* mode in ESTAR_MODE<br>Wait for 16 clock cycles |
| D | Program new SDRAM Refresh count for $f_{CPU/6}$<br>Program E* mode in ESTAR_MODE<br>Shutdown external devices<br>Set SDRAM Self Refresh Enable bit |
| E | Program SDRAM Refresh count for $f_{CPU/2}$<br>Reset SDRAM Self Refresh Enable bit<br>Program E* mode in ESTAR_MODE<br>Wait for 16 clock cycles<br>Activate external devices |
| F | Set SDRAM Self Refresh Enable bit |
| G | Reset SDRAM Self Refresh Enable bit |
| H | Program SDRAM Refresh count for $f_{CPU/6}$<br>Program E* mode in ESTAR_MODE<br>Wait for 16 clock cycles before transition |

Whenever a transition occurs from a higher mode to a lower mode, i.e., transitions A, D, and H, considerations need to be made in addition to the steps listed in Table 3. For transition A, system software must read an original auto-refresh count and program a new auto-refresh count (less than original auto-refresh count based on SDRAM specifications). Thereafter, it must wait (64*auto-refresh count cycles+new auto-refresh cycles) to ensure that the new refresh count is loaded into hardware. Referring to transition D, system software must read the original auto-refresh count and program a new auto-refresh count (less than original auto-refresh count based on SDRAM specifications). Thereafter, it must wait (64*½ mode auto-refresh count cycles+new auto-refresh count cycles) to ensure the new refresh count is loaded into hardware. Furthermore, for transition H, system software must read the original auto-refresh count and program a new auto-refresh count (less than original auto-refresh count based on SDRAM specifications).

Figure 4:
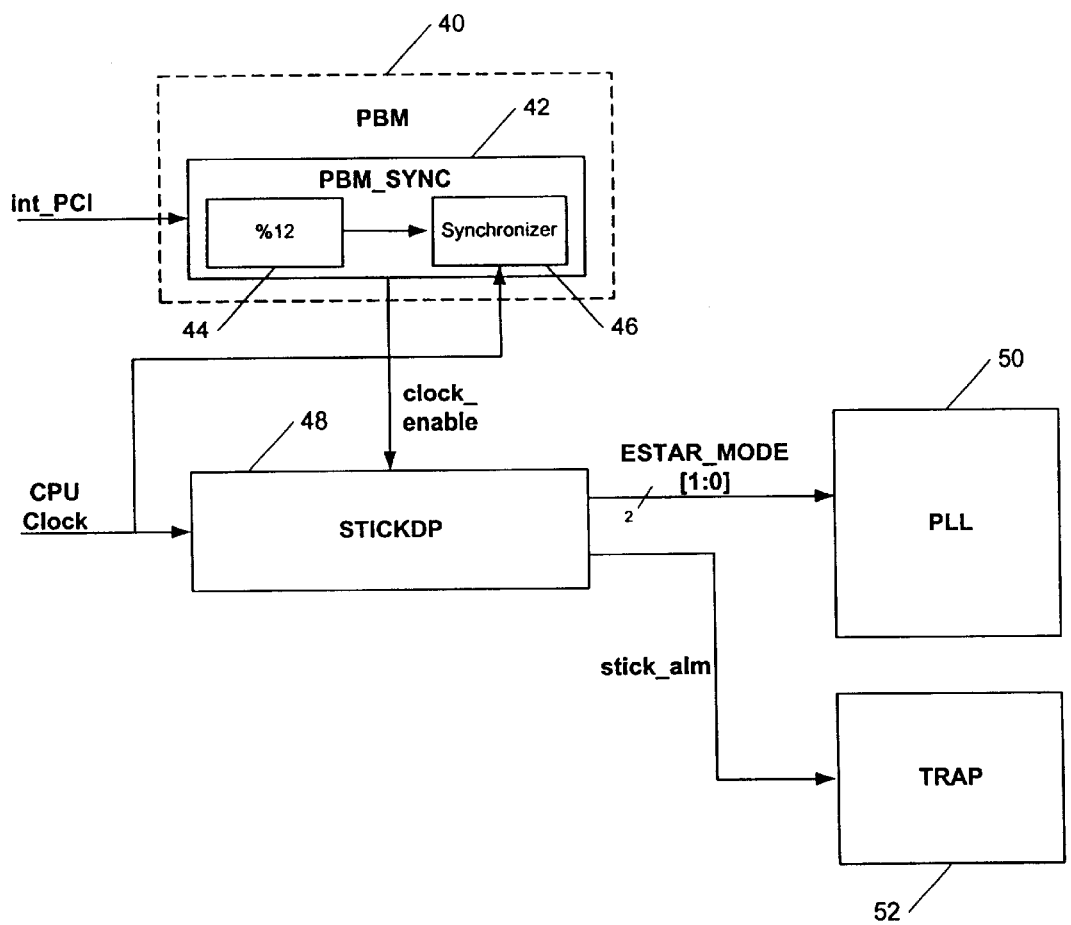
FIG. 4 is a block diagram of a power management system in accordance with an embodiment of the present invention.

FIG. 4 is a hardware block diagram for a power management system of an exemplary embodiment of the present invention. The figure includes a PBM unit (40) with a portion of the PBM unit (40) designated to serve as a PBM synchronizer unit ("PBM_SYNC") (42). The PBM_SYNC (42) serves to generate a constant frequency using a PCI frequency signal, i.e., int_PCI, and a CPU clock frequency signal, i.e., CPU clock. The PBM_SYNC (42) comprises a divide by 12 frequency counter (44) and a frequency synchronizer (46). The int_PCI frequency signal, which is the internal PCI clock frequency, is provided at the input of the divide by 12 frequency counter (44). The divide by 12 frequency counter (44) divides the int_PCI frequency signal by 12 and then outputs a divided int_PCI frequency signal. The divided int_PCI frequency signal is then fed into the frequency synchronizer (46) which synchronizes the divided int_PCI frequency signal and the CPU clock frequency signal. For example, in one embodiment of the present invention, the int_PCI frequency signal is 66 MHz and the CPU clock frequency signal is 500 MHz. Therefore the PBM_SYNC (42) outputs a 5.5 MHz frequency signal which is synchronized to the CPU clock frequency signal.

The resulting synchronized output signal from the PBM_SYNC (42) serves as a clock_enable signal for a STICKDP unit (48). The STICKDP unit (48) comprises circuitry that generates periodic interrupts to an operating system for event and process scheduling. The clock_enable signal that is provided as an input to the STICKDP unit (48) serves to give the STICKDP unit (48) a reference of time for its operations. Discussions below with reference to FIGS. 5 and 6 explain in more detail the operation of the STICKDP unit (48).

The STICKDP unit (48) passes two bits of data to a phase locked loop unit ("PLL") (50). The two bits of data are passed on a two-bit bus, i.e., ESTAR_MODE[1:0] bus, and include the values of the two bits in the Estar Mode register. The PLL (50) is used by the power management scheme to store specific power save mode values. For example, the PLL (50) comprises dividers (not shown) which are assigned specific values indicating particular power save modes. Additionally, when certain conditions (discussed below) are met, the STICKDP unit (48) outputs a stick_alm signal which serves to notify a trap ("TRAP") unit (52) that a trap signal needs to be generated to the processor. A more detailed discussion of the aforementioned components is given below.

Figure 5:
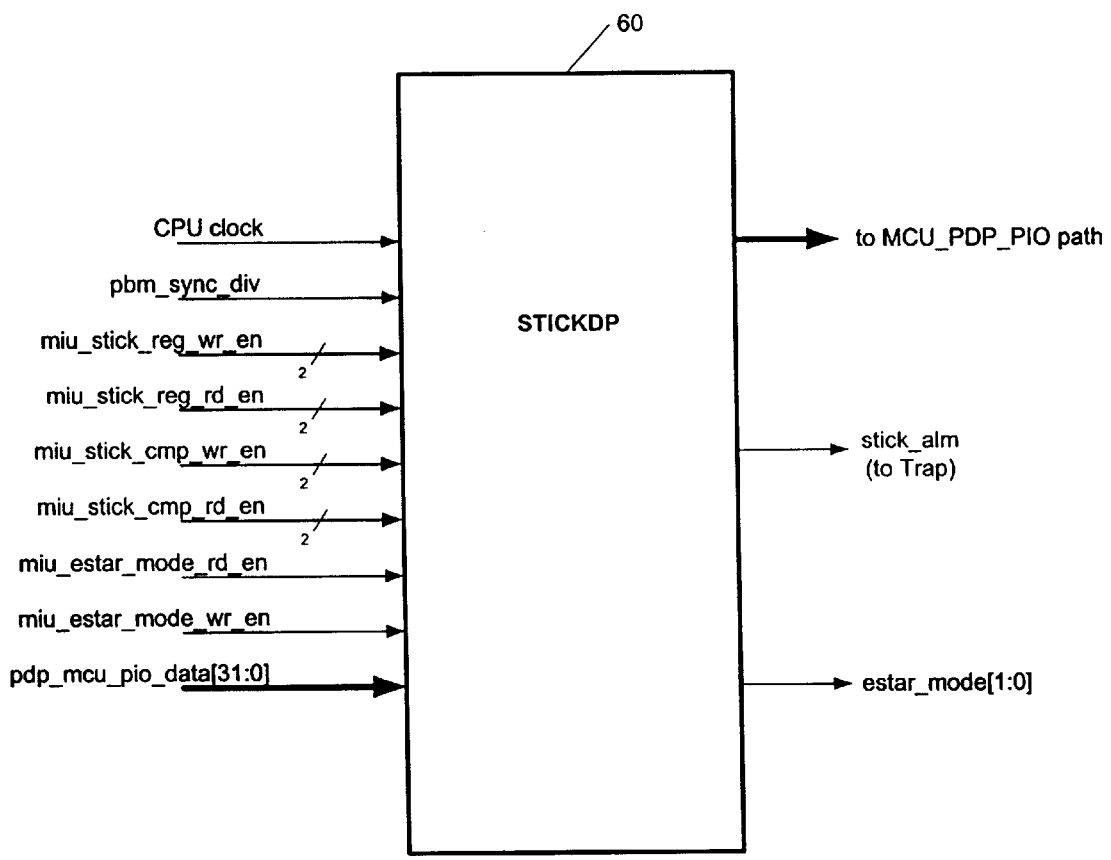
FIG. 5 is a high-level block diagram of a computer subsystem in accordance with an embodiment of the present invention.

FIG. 5 is a high-level block diagram for a STICKDP unit (60) of an exemplary embodiment of the present invention. The STICKDP unit (60) has input and output signals which are shown in FIG. 5 and described in Table 4.

TABLE 4

Signal and Bus Descriptions for FIG. 5

| Signal Name | Input/Output | Description |
|---|---|---|
| CPU clock | Input | CPU clock |
| pbm_sync_div | Input | clock_enable for STICKDP |
| Miu_stick_reg_wr_en | Input | STICK_REG write enable |

TABLE 4-continued

Signal and Bus Descriptions for FIG. 5

| Signal Name | Input/Output | Description |
| --- | --- | --- |
| Miu_stick_reg_rd_en | Input | STICK_REG read enable |
| Miu_stick_cmp_wr_en | Input | STICK_COMPARE write enable |
| Miu_stick_cmp_rd_en | Input | STICK_COMPARE read enable |
| Miu_estar_mode_rd_en | Input | ESTAR_MODE write enable |
| Miu_estar_mode_wr_en | Input | ESTAR_MODE read enable |
| Pdp_mcu_pio_data[31:0] | Input | Data bus input |
| stick_alm | Output | Stick alarm output to TRAP block |
| estar_mode[1:0] | Output | ESTAR MODE register |

Figure 6:
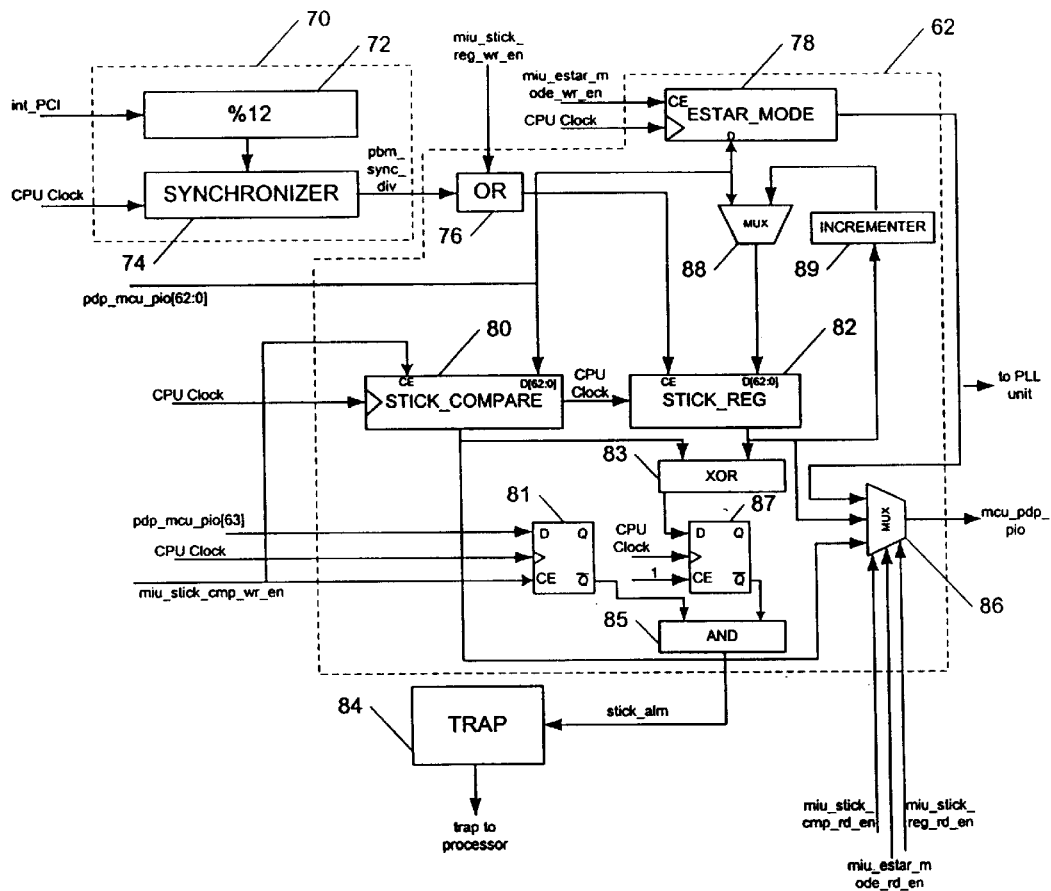
FIG. 6 is a low-level block diagram of a power management system in accordance with an embodiment of the present invention.

Referring now to FIG. 6, a low-level block diagram of an exemplary embodiment of the present invention is shown to illustrate the functions of the signals listed in Table 4. The figure also shows circuitry of a STICKDP unit (62) and its interfaces with the PBM_SYNC (70) and the TRAP unit (84).

The PBM_SYNC (70) comprises, as mentioned above, a divide by 12 frequency counter (72) and a frequency synchronizer (74). An int_PCI frequency signal serves as an input for the divide by 12 frequency counter (72). The divide by 12 frequency counter (72) divides the int_PCI frequency signal by 12 and outputs a divided int_PCI frequency signal to the frequency synchronizer (74) which synchronizes the divided int_PCI frequency signal with the CPU clock frequency signal. The frequency synchronizer (74) then outputs a pbm_sync_div signal that has a frequency of the int_PCI frequency signal divided by 12 and synchronized to the CPU clock frequency signal.

The int_PCI frequency signal, as mentioned above, is the internal PCI clock. In one embodiment of the present invention, the int_PCI frequency signal has a frequency of 66.67 MHz when the external PCI clock has a frequency of 33.3 MHz. For the UltraSparc-IIe, the external PCI clock remains fixed at all times irrespective of power save modes. The power save modes implemented through a power management scheme only change the CPU core frequency and leave the PCI clock unaltered for all power save modes supported by the scheme.

For an embodiment of the present invention which implements the UltraSparc-IIe microprocessor, the int_PCI frequency signal should not exceed 66 MHz if Estar mode ⅙ is to be supported. This is due to the limitation of the interface between the CPU core frequency and the PCI core frequency, which requires that $f_{CPU} >= 2\ f_{EXTERNAL\_PCI}$. Estar mode ⅙ is chosen for a processor running at 500 MHz in normal mode so that the value of ⅙ of the normal operating frequency, 83.3 MHz, still comports to the $f_{CPU} >= 2\ f_{EXTERNAL\_PCI}$ requirement.

The CPU clock frequency signal referenced in FIG. 6 is the CPU core internal clock frequency, which typically has a value of 500 MHz or more.

To help an operating system keep track of time for process and event scheduling in a frequency changing environment, i.e., entering and exiting power save modes, embodiments of the present invention include a STICKDP unit (62) which comprises an Estar Mode register ("ESTAR_MODE") (78), a stick compare register ("STICK_COMPARE") (80), a stick register ("STICK_REG") (82), and additional circuitry used by the power management system. STICK_COMPARE (80) and STICK_REG (82) serve to provide periodic interrupts to the operating system regardless of whether the CPU clock frequency signal is changing. In other words, STICK_COMPARE (80) and STICK_REG (82) are implemented to prevent interrupt periods from varying and causing indeterministic event scheduling as the CPU clock frequency signal changes when entering and exiting power save modes.

STICK_REG (82) is a 64-bit register that serves as a counter for the operating system and provides a constant time reference for issuing interrupts and process requests. The most significant bit in STICK_REG (82) (STICK_REG[63]) is always '1' and this bit location is not written to or read from by the processor. The remaining 63 bits keep a current count for the operating system. STICK_REG (82) starts counting after a system reset.

STICK_COMPARE (80) is a 64-bit register that can be written to and read from by the processor. STICK_COMPARE (84) holds the data value which is compared to the data value in STICK_REG (82) at the rate of the internal PCI clock divided by 12. In other words, STICK_COMPARE (80) is provided to store the timeout value that gets compared with the incrementing STICK_REG (82).

In an embodiment of the present invention, the registers, STICK_COMPARE (80) and STICK_REG (82), operate at 5.5 MHz (internal PCI clock divided by 12). However, those skilled in the art will appreciate that other embodiments may use different frequency values depending on the PCI frequency.

The discussed pbm_sync_div signal, upon being outputted by the PBM_SYNC (70), is ORed (76) with a miu_stick_reg_wr_en signal. The miu_stick_reg_wr_en signal is generated by a memory interface unit ("MIU") (not shown). The MIU is where the address of STICK_REG (82) is decoded for read/write access. The miu_stick_reg_wr_en signal serves as an enable signal for performing a write operation into STICK_REG (82). The output signal from the OR gate (76) serves as a clock enable signal for STICK_REG (82) which, in effect, determines whether or not STICK_REG (82) increments. The primary purpose of ORing (76) the pbm sync div signal and miu_stick_reg_wr_en signal is to ensure that STICK_REG (82) does not increment when a write process occurs to STICK_REG (82) by the processor. When the miu_stick_reg_wr_en signal is simultaneously active with the pbm_sync_div signal, the output signal from the OR gate (76) serves to disable the clock enable input of STICK_REG (82), i.e., STICK_REG (82) is not allowed to increment. When the miu_stick_reg_wr_en signal is not active, the OR gate (76) outputs an active signal which enables the clock enable input to STICK_REG (82), i.e., STICK_REG (82) is allowed to increment.

ESTAR_MODE (78) (discussed above) is a register used by power management software to enable or disable a power save mode. The register is primarily used to enter the various power save modes (½ and ⅙ modes) or to remain in the normal operating frequency mode (1/1 mode). ESTAR_MODE (78) is 64 bits wide, but only the two least significant bits are used. The values of the two bits are sent to a PLL unit (discussed below with reference to FIG. 7). Those skilled in the art will appreciate that other embodiments may use a different number of power save modes or different values for the power save modes.

A miu_estar_mode_wr_en signal serves as an input to ESTAR_MODE (78) and is used as a clock enable input for ESTAR_MODE (78). ESTAR_MODE (78) also inputs the CPU clock frequency since ESTAR_MODE (78) operates at the CPU frequency. The miu_estar_mode_wr_en signal comes from the MIU (not shown), which decodes the address of ESTAR_MODE (78). In order to select a power save mode, the processor has to write two bits into ESTAR_MODE (78) via a pdp_mcu_pio[62:0] bus. The pdp_mcu_pio[62:0] bus is an internal bus used by the processor to write into ESTAR_MODE (78) and other registers. When the miu_estar_mode_wr_en signal is active, the clock enable input of ESTAR_MODE (78) is enabled and ESTAR_MODE (78) latches in the two bits from the pdp mcu_pio[62:0] bus at the rate of the CPU clock frequency. When the miu_estar_mode_wr_en signal is not active, the clock enable input of ESTAR_MODE (78) is disabled and it retains the values of the bits residing in the register.

The pdp_mcu_pio[62:0] bus is also used by the processor to write data to STICK_REG (82). The data is multiplexed (88) with an incremented value (89) and the multiplexor (88) then outputs data to STICK_REG (82). For example, if the processor needs to write specific data values into STICK_REG (82), the processor sends the data via the pdp_mcu_pio[62:0] bus to the input of the multiplexor (88), which outputs the data to STICK_REG (82). STICK_REG (82) thereafter continues to increment based on the data it receives from the processor. When STICK_REG (82) increments based on data already residing in STICK_REG (82), the incrementer (89) increments the data value in STICK_REG (82) and then passes it to the input of the multiplexor (88), which in turn outputs the incremented data value to STICK_REG (82). STICK_REG (82) uses the CPU clock frequency when it is latching in data from the processor.

The pdp_mcu_pio[62:0] bus is also used by the processor to write data to STICK_COMPARE (80). STICK_COMPARE (80) uses a miu_stick_cmp_wr_en signal to serve as its clock enable input. The miu_stick_cmp_wr_en signal is generated by the MIU (not shown). The MIU (not shown) decodes the address of STICK_COMPARE (80) and generates the miu_stick_cmp_wr_en signal. When the miu_stick_cmp_wr_en signal is active, it enables the clock enable input of STICK_COMPARE (80), and STICK_COMPARE (80) is allowed to read in data from the pdp_mcu_pio[62:0] bus at the rate of the CPU clock frequency.

The values of STICK_COMPARE (80) and STICK_REG (82) are compared at the rate of the pbm_sync_div frequency signal since that is the rate at which STICK_REG (82) increments. The data values of STICK_COMPARE (80) and STICK_REG (82) serve as inputs to an exclusive OR gate (83). Each bit of STICK_COMPARE (80) is exclusive ORed (83) with a corresponding bit in STICK_REG (82). If the bits are either both high or both low, the exclusive OR gate (83) outputs a low signal. Two D-flip flops (81, 87) are provided to help in comparing the values of STICK_COMPARE (80) and STICK_REG (82) once individual bits pass through the exclusive OR gate (83). The first D-flip flop (81) is used to serve as a reference flip flop for the second D-flip flop (87). The first D-flip flop (81) inputs a bit from the pdp_mcu_pio[63] signal. The first D-flip (81) flop operates at the CPU clock frequency and also inputs the miu_stick_cmp_wr_en signal as a clock enable input. Because the D input for the first D-flip flop (81) will be low when software writes a '0' to STICK_COMPARE[63] (discussed below), the $\overline{Q}$ output for the first D-flip flop (81) will accordingly be high whenever the miu_stick_cmp_wr_en signal is active, which, in turn, causes the CPU clock frequency to pulse the first D-flip flop (81). The second D-flip flop (87) inputs the output of the exclusive OR gate (83) as its D input. The second D-flip flop (87) is also pulsed by the CPU clock frequency. The clock enable input for the second D-flip flop (87) is always high ("1"), and therefore, the second D-flip flop (87) is always being pulsed by the CPU clock frequency. For every clock pulse to the second D-flip flop (87), the bit value at the $\overline{Q}$ output after the pulse is equal to the inverted value of the bit at the D input before the pulse. The bit value at the $\overline{Q}$ output of the second D-flip flop (87) and the bit value at the $\overline{Q}$ output of the first D-flip flop (81) are inputted into an AND gate (85). If both the inputs to the AND gate (85) are high for all the bits sent from STICK_COMPARE (80) and STICK_REG (82), the AND gate (85) generates a stick_alm signal. To summarize, when two inputs to the exclusive-OR gate (83) are identical in value, the exclusive OR gate (83) outputs low, and the second D-flip flop (87) outputs high at its $\overline{Q}$ output. Then, based on the $\overline{Q}$ output of the first D-flip-flop being high, the AND gate (85) will generate a high bit value on the stick alm signal.

The stick_alm signal generated by the AND gate (85) is generated when the value in STICK_COMPARE (80) equals the value in STICK_REG (82). Once generated, the stick_alm signal is passed to the TRAP unit (84). Upon receiving the stick_alm signal, the TRAP unit (84) generates a trap signal to the processor. The trap is used by the operating system to perform administrative tasks such as event scheduling, process scheduling, and handling process requests.

As mentioned previously, STICK_COMPARE (80) is a 64-bit register. The most significant bit of STICK_COMPARE (80) (STICK_COMPARE[63]) is used to denote whether to enable or disable the stick_alm signal generation. Software can write a '1' to STICK_COMPARE [63] to disable the generation of the stick_alm signal. The remaining 63 bits of STICK_COMPARE (80) (STICK_COMPARE[62:0]) represent the value to be compared with STICK_REG (82).

Miu_stick_reg_rd_en, miu_estar_mode_rd_en, and miu_stick_compare_rd_en are signals decoded by the MIU (not shown) to enable read operations. When the processor needs to read the data in STICK_COMPARE (80), STICK_REG (82), or ESTAR_MODE (78), the processor loads the address of the register to be read, and then the MIU (not shown) decodes that address and provides the decode signal which selects the corresponding data from the desired register through a multiplexor (86). The multiplexor (86) uses the miu_stick_reg_rd_en, miu_estar_mode_rd_en, and miu_stick_compare_rd_en signals as select inputs and uses the values of STICK_COMPARE (80), STICK_REG (82), and ESTAR_MODE (78) as inputs. For example, if the processor needs to read the data in ESTAR_MODE (78), the miu_estar_mode_read_en signal is selected and the value of ESTAR_MODE (78) is passed to the output of the multiplexor (86). The output from the multiplexor (86) goes to the processor via a mcu_pdp_pio bus. The mcu_pdp_pio bus is the read bus which the processor uses to read data from the registers (78, 80, 82).

Figure 7:
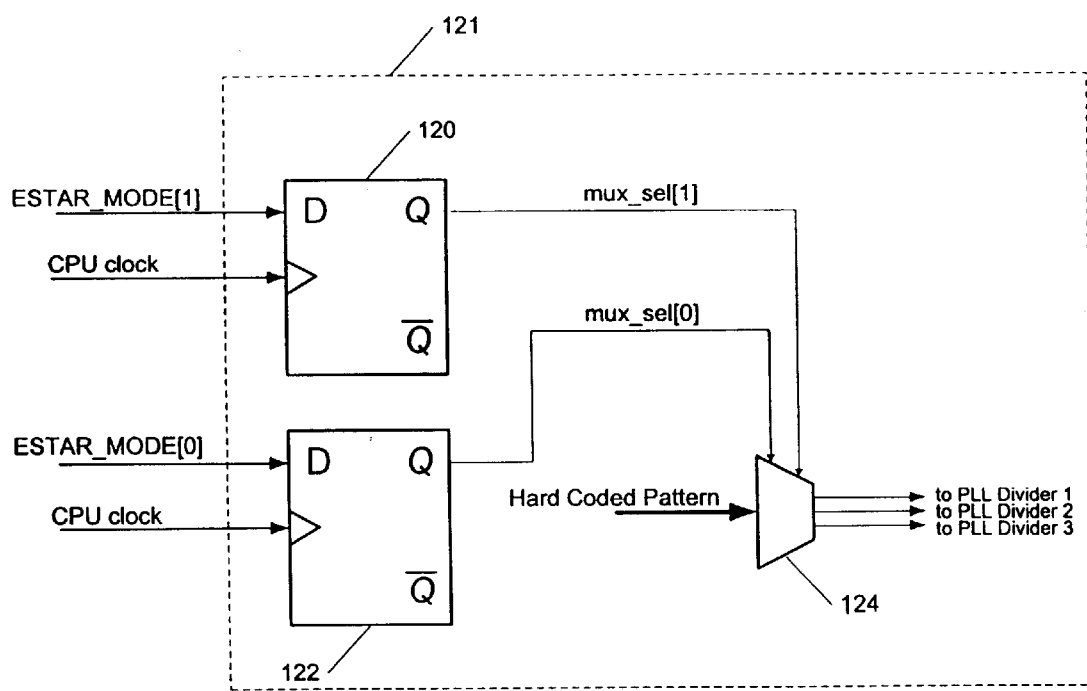
FIG. 7 is a block diagram of a computer subsystem in accordance with an embodiment of the present invention.

FIG. 7 shows circuitry of a PLL unit (121) in accordance with an embodiment of the present invention. PLL control is needed in order to change the values of three dividers inside the PLL unit (121). The purpose of the PLL unit (121) is to give the system the ability to transit to different power save modes based on the value loaded inside dividers (not shown) of the PLL unit (121). In this exemplary embodiment, there are three dividers in the PLL unit (121). Based on the contents of ESTAR_MODE (78), these three dividers are loaded with distinct values. For the current embodiment, the PLL unit (121) transits to ⅓, ½, and ⅙ power save modes based on the divider values (not shown). Those skilled in the art will appreciate that in other embodiments, additional dividers may be used for systems which operate at frequencies greater than 500 MHz.

Whenever software decides to change the mode of the system, the software writes into ESTAR_MODE (78). FIG. 7 depicts the selection mechanism by which the value of ESTAR_MODE (78) causes an operating frequency change. ESTAR_MODE (78), as mentioned previously, uses two bits to denote the mode of the system. The bits, ESTAR_MODE[1] and ESTAR_MODE[0], are inputted separately as D inputs for two different D-flip flops (120, 122). The D-flip flops (120, 122) are each pulsed by the CPU clock frequency. After each clock pulse, the D-flip-flops (120, 122) generate, at each Q output, the value at each respective D input before the clock pulse. The outputs of the D-flip flops (120, 122), mux_sel[1] and mux_sel[0], serve as select signals to a multiplexor (124) which inputs a hard coded pattern. The hard coded pattern comprises specific power save mode values that are used by the processor to lower the CPU frequency. Based on the combination of mux_sel[1] and mux_sel[0], the multiplexor (124) outputs the pattern designated by ESTAR_MODE (78), and loads the specific power save mode values into the three PLL dividers. In all power save modes, only the values of the PLL dividers are changed. A voltage controlled oscillator used by the PLL unit (121) to reference time never changes its frequency, and therefore, the PLL unit (121) never loses its lock, i.e., it has its own reference of time which is independent of other system frequencies.

Figure 8:
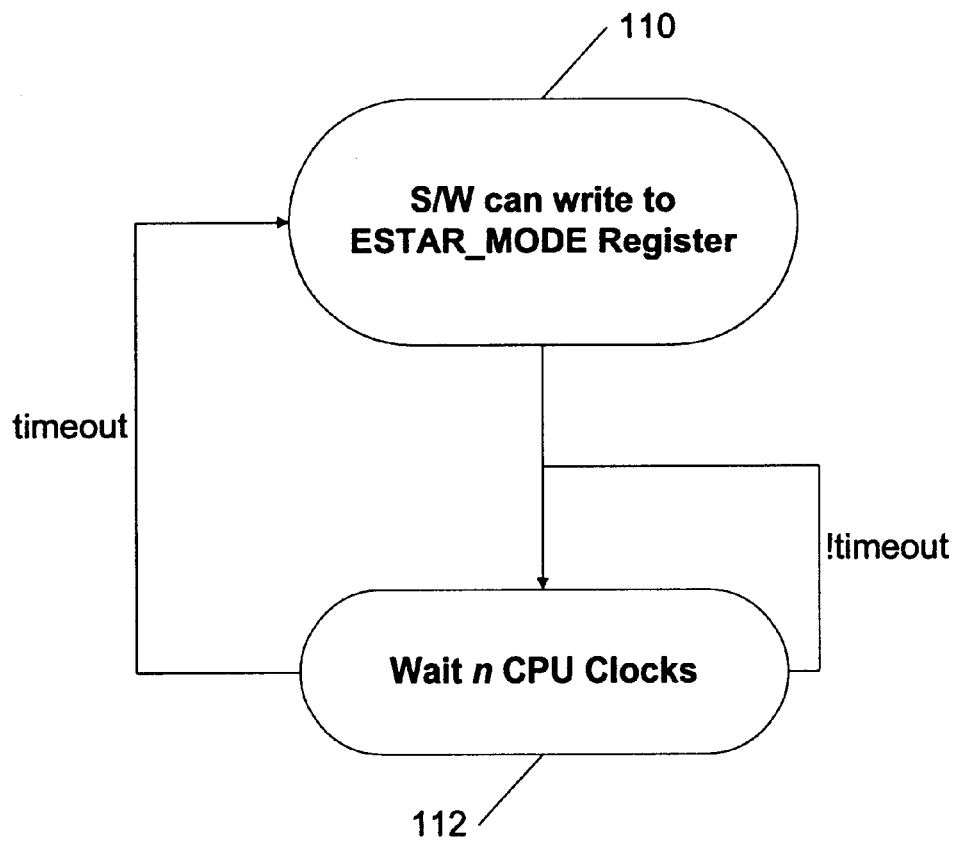
FIG. 8 shows a flow chart describing a process in accordance with an embodiment of the present invention.

FIG. 8 is a flow diagram that relates to a software requirement of an exemplary embodiment of the present invention. The diagram illustrates that software must wait at least n clock cycles (112) between two consecutive writes to ESTAR_MODE (78) (110). The wait is necessary so that the PLL unit (121) can settle down due to a previous mode switch. Only after n CPU clock cycles, i.e., a timeout, will the new mode bits for a subsequent mode be passed to the multiplexor (124) as select inputs. The value of n must be greater than or equal to 16 for systems with industry standard non-registered SDRAM. Non-registered SDRAM is memory that primarily uses the CPU clock to latch in data.

Advantages of the present invention may include one or more of the following. In one or more embodiments of the present invention, a computer system can conserve power by lowering its CPU frequency without varying the frequency upon which an operating system is dependent to perform system administrative tasks. Because the operating system does not use the CPU clock frequency, which can change, the operating system is provided with an absolute time reference upon which to handle event scheduling, process scheduling, thread scheduling, process requests, etc. The operating system does not have to wait for the CPU to complete the transition to a power save mode frequency, and therefore, CPU clock cycles are not wasted with respect to the operating system. Those skilled in the art will appreciate that the present invention also may include other advantages and features.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for conserving power in a computer system, comprising:
   indicating to the computer system that the computer system needs to enter into one of a plurality of power save modes;
   changing a CPU clock frequency to conserve power when the indication has been made; and
   generating a constant time reference signal regardless of changes to the CPU clock frequency, wherein the generating comprises:
      inputting a peripheral component interconnect clock signal of the computer system, and
      synchronizing a signal dependent on the peripheral component interconnect clock signal with the CPU clock frequency.

2. The method of claim 1, wherein the indication comprises writing a plurality of bits into a power save mode register, and wherein changing the CPU clock frequency is based on power save values in a PLL, the method further comprising:
   using the plurality of bits in the power save mode register to determine which power save values in the PLL to use after the indication has been made and before changing the CPU clock frequency; and
   entering into one of the plurality of power save modes based on which power save values are used.

3. The method of claim 1, further comprising:
   instructing memory units to operate independent of the CPU clock frequency before the computer system enters one of the plurality of power save modes.

4. The method of claim 3, wherein the memory units comprise SDRAM, the method further comprising:
   writing a plurality of bits to a memory controller to command the SDRAM to operate in self-refresh mode;
   activating the SDRAM on an incoming memory access;
   returning the SDRAM to self-refresh mode when the incoming memory access completes;
   clearing the plurality of bits in the memory controller; and
   resuming normal SDRAM operation when the plurality of bits in the memory controller have been cleared.

5. The method of claim 1, wherein generating the constant time reference signal comprises:
   inputting a frequency signal generated by a CPU clock;
   dividing the frequency signal to generate a divided frequency signal;
   synchronizing the divided frequency signal with a second frequency signal generated by a PCI clock; and
   generating the constant time reference signal therefrom.

6. The method of claim 1, further comprising:
   registering a first data value in a first register;
   incrementing the first data value at a rate of the constant time reference signal;
   registering a second data value in a second register;
   comparing the first data value with the second data value; and
   selectively generating an interrupt to an operating system based on the comparison.

7. The method of claim 6, wherein the comparison of the first data value with the second data value occurs at the rate of the CPU clock frequency, the method further comprising:
   issuing the interrupt to the operating system when the comparison of the first data value with the second data value indicates that the first data value and the second data value are equal.

8. The method of claim 6, wherein a plurality of interrupts are selectively generated to the operating system at the rate of the constant time reference signal, the method further comprising:
   selectively generating the plurality of interrupts when the CPU clock frequency is changing.

9. The method of claim 8, wherein the operating system uses the plurality of interrupts to perform operating system tasks.

10. The method of claim 1, wherein the indication to the computer system that the computer systems needs to enter into one of the plurality of power save modes occurs when a plurality of specified computer resources have been idle for a designated amount of time.

11. The method of claim 10, further comprising:
switching between the plurality of power save modes dependent upon activity of the plurality of specified computer resources; and
instructing the computer system to return to a normal CPU operating frequency when the plurality of specified computer resources become active.

12. A power management system for a computer system, comprising:
software that instructs the computer system to enter into a power save mode;
power save circuitry that lowers a CPU clock frequency to conserve power dependent upon instructions by the software;
a constant frequency generator that generates a constant frequency signal that is constant regardless of changes to the CPU clock frequency, wherein the constant frequency generator synchronizes a signal dependent on a peripheral component interconnect clock signal of the computer system with the CPU clock frequency; and
an operating system support that selectively generates interrupts to an operating system using the constant frequency signal.

13. The system of claim 12, wherein the instructions by the software comprise writing a plurality of bits into a power save mode register, the system further comprising:
PLL circuitry that uses the plurality of bits in the power save mode register to determine which of a plurality of power save modes to enter.

14. The method of claim 12, wherein the software sequences hardware from a current mode to a desired power save mode.

15. A power management system for a computer system, comprising:
software that instructs the computer system to enter into a power save mode;
power save circuitry that lowers a CPU clock frequency to conserve power dependent upon instructions by the software;
a constant frequency generator that generates a constant frequency signal that is constant regardless of changes to the CPU clock frequency,
wherein the constant frequency generator comprises:
a frequency divider that inputs a first frequency signal generated by a CPU clock and divides the first frequency signal to generate a divided frequency signal; and
a frequency synchronizer that inputs the divided frequency signal and a second frequency signal generated by a PCI clock, synchronizes the divided frequency signal with the second frequency signal, and generates the constant frequency signal; and
an operating system support that selectively generates interrupts to an operating system using the constant frequency signal.

16. The system of claim 12, wherein the operating system support comprises:
a first register having a first data value which the first register increments at a rate of the constant frequency signal; and
a second register having a second data value that is compared with the first data value at a rate of the CPU clock frequency.

17. The system of claim 16, wherein the comparison between the first data value and the second data value is used to determine when interrupts should be issued to the operating system.

18. The system of claim 13, wherein the PLL circuitry comprises part of the power save circuitry, and wherein the PLL circuitry comprises a plurality of dividers that include power save values for the plurality of power save modes.

19. The system of claim 18, wherein the plurality of dividers comprise values indicative of different operating frequencies for the computer system.

20. The system of claim 19, wherein the PLL circuitry changes the CPU clock frequency based on the value of an operating CPU frequency in the plurality of dividers in the PLL determined by the plurality of bits in the power save mode register.

* * * * *